(12) United States Patent
Liang

(10) Patent No.: US 9,864,416 B2
(45) Date of Patent: Jan. 9, 2018

(54) PORTABLE ELECTRONIC DEVICE

(71) Applicant: Wistron Corporation, New Taipei (TW)

(72) Inventor: Chen-Yi Liang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/281,804

(22) Filed: Sep. 30, 2016

(65) Prior Publication Data

US 2017/0315593 A1 Nov. 2, 2017

(30) Foreign Application Priority Data

Apr. 29, 2016 (TW) .............................. 105113485 A

(51) Int. Cl.
*G06F 1/16* (2006.01)

(52) U.S. Cl.
CPC .......... *G06F 1/1681* (2013.01); *G06F 1/1626* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 6,504,707 B2* | 1/2003 | Agata | .................. | G06F 1/1616 248/919 |
| 7,148,874 B2* | 12/2006 | Anzai | .................... | F16M 11/10 345/156 |
| 8,766,921 B2* | 7/2014 | Ballagas | ............... | G06F 1/1626 345/168 |
| 9,057,213 B2* | 6/2015 | Lai | ........................... | E05D 7/00 |
| 9,095,194 B2* | 8/2015 | Hassett | .................. | A45C 11/00 |
| 9,489,054 B1* | 11/2016 | Sumsion | ............... | G06F 3/0208 |
| 9,516,937 B2* | 12/2016 | Piatt | ....................... | A45C 13/34 |
| 9,532,631 B2* | 1/2017 | Gu | ......................... | A45C 11/00 |
| 9,600,034 B2* | 3/2017 | Kiple | ................... | G06F 1/1626 |
| 9,668,556 B2* | 6/2017 | Senatori | ................ | A45C 11/00 |
| 2013/0214887 A1 | 8/2013 | Lauder et al. | | |

(Continued)

FOREIGN PATENT DOCUMENTS

TW 201220669 5/2012
TW I368474 7/2012

(Continued)

*Primary Examiner* — Lisa Lea Edmonds
(74) *Attorney, Agent, or Firm* — Muncy, Geissler, Olds & Lowe, P.C.

(57) ABSTRACT

A portable electronic device has a device body, a hinge unit, a driving unit and a support unit. The device body has a first connecting element. The hinge unit disposes at an end of the device body. The driving unit disposes in the device body and has a second connecting element. The support unit rotates relative to the device body for a closed state and a support state. The support unit has a third connecting element and a fourth connecting element. When the support unit in the closed state, the third connecting element connects with the first connecting element; the fourth connecting element connects with the second connecting element. When the driving unit moves to a driving position, the fourth connecting element detaches from the second connecting element, and the support unit rotates to the support state due to rotation of the hinge unit.

18 Claims, 9 Drawing Sheets

(56) References Cited

U.S. PATENT DOCUMENTS

| | | | |
|---|---|---|---|
| 2014/0036429 A1* | 2/2014 | Bryan | A45C 13/1069 |
| | | | 361/679.3 |
| 2014/0299740 A1* | 10/2014 | Peng | G06F 1/1632 |
| | | | 248/688 |
| 2014/0304947 A1 | 10/2014 | Wang | |
| 2017/0108893 A1* | 4/2017 | Arima | G06F 1/1616 |

FOREIGN PATENT DOCUMENTS

| TW | I488569 | 6/2015 |
|---|---|---|
| TW | I505071 | 10/2015 |

\* cited by examiner

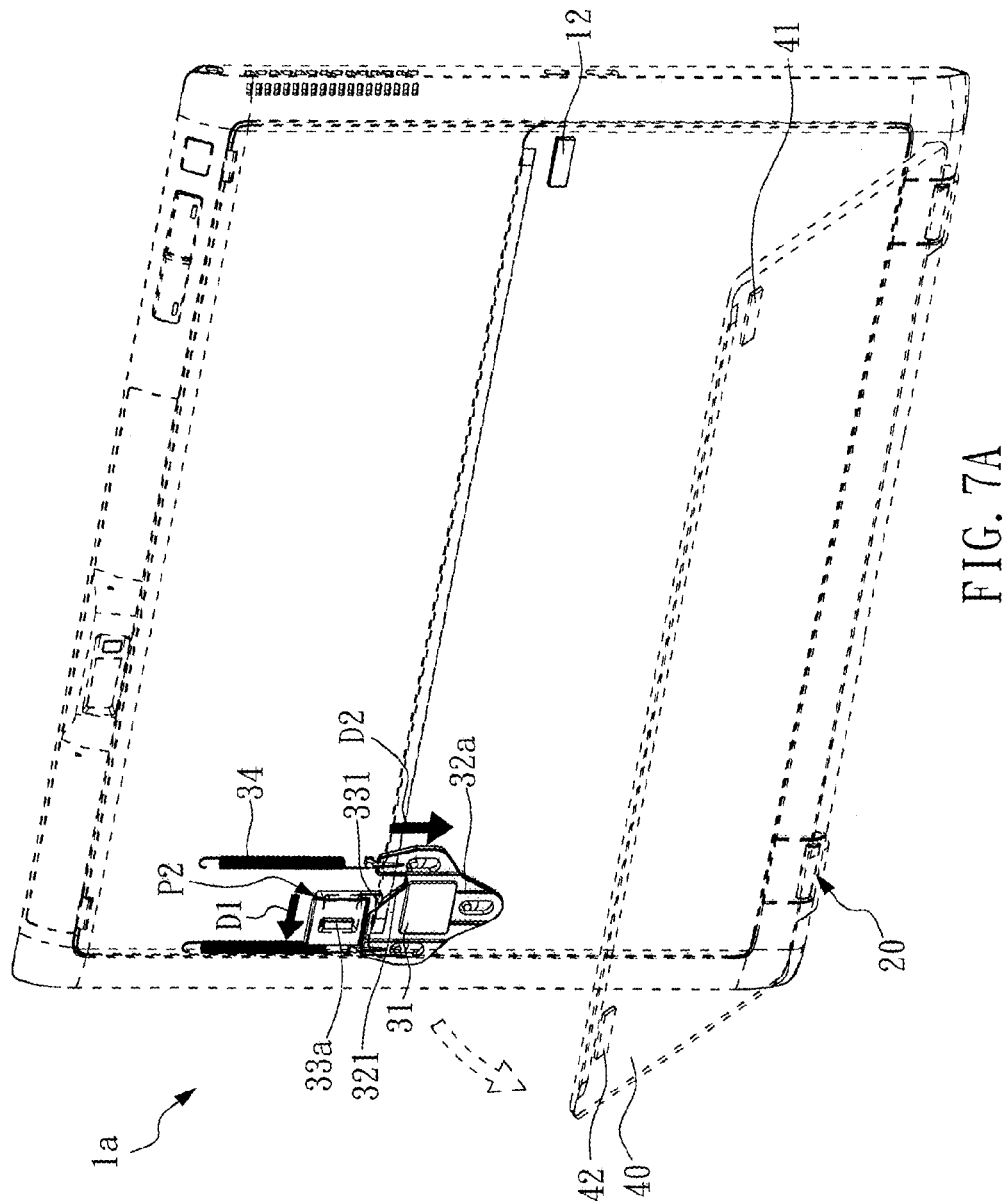

PORTABLE ELECTRONIC DEVICE

BACKGROUND OF THE INVENTION

1. Field of the Invention

The present invention relates to a portable electronic device, particularly to a portable electronic device in which a support unit can be opened up after one side of the device body detaches from one side of the support unit.

2. Description of the Related Art

In recent years, with the rapid development of electronic devices related technologies, owning a tablet PC or a smartphone is common to modern people. Hereafter, the tablet PC is used as an example for illustration. To facilitate viewing the display content of the tablet computer, the user needs to use a support bracket or hands to support the tablet PC and let the tablet PC remain standing state. At present, a hidden support bracket may be provided within the tablet PC. However, such bracket mostly uses a rod to connect fixing elements at both sides of the bracket. When a user pushes the start button or switch, by moving the rod, the fixing elements at both sides of the support bracket detach from the Tablet PC, such that the hidden bracket is released. Such design mostly involves complex interlocking mechanism, and need to occupy space inside the tablet PC. Therefore, there is still room for progress and improvement in the design of an opening/closing device for connecting the support bracket.

SUMMARY OF THE INVENTION

It is a major objective of the present invention to provide a portable electronic device in which a support unit can be opened up after one side of the device body detaches from one side of the support unit.

To achieve the above objective, the portable electronic device of the present invention includes a main body, a hinge unit, a driving unit and a support unit. The main body includes a first connecting element. The hinge unit is disposed at one end of the main body. The driving unit is movably disposed in the main body. The driving unit includes a second connecting element. The support unit rotates relative to the main body between a closed state and a support state. The support unit includes a third connecting element and a fourth connecting element. When the support unit is in the closed state, the third connecting element is connected to the first connecting element, and the fourth connecting element is connected to the second connecting element. When the driving unit moves from an initial position to a driving position, attraction between magnetic poles is changed to repulsion, the second connecting element detaches from the fourth connecting element, and through the driving of the hinge unit the first connecting element detaches from the third connecting element, by which the support unit rotates from the closed state to the support state.

Through the design of the present invention, after the second connecting element of the driving unit detaches from the third connecting element of the support unit, the first connecting element detaches from the third connecting element through the driving of the hinge unit. Through the repulsive force between the second connecting element and the fourth connecting element and driving of the hinge unit, the first connecting element detaches from the third connecting element, and the support unit rotates from the closed state to the support state.

BRIEF DESCRIPTION OF THE DRAWINGS

FIG. 7A and FIG. 7B are schematic drawings showing the driving unit at the driving position and the support unit rotating from the closed state to the support state according to the third embodiment;

FIG. 7B is a partial enlarged view of the driving unit as shown in FIG. 7A according to the third embodiment.

DETAILED DESCRIPTION OF THE PREFERRED EMBODIMENT

Hereafter, the technical content of the present invention will be better understood with reference to preferred embodiments. Please refer to FIG. 1 to FIG. 5 respectively, which is a schematic drawing of a support unit of a portable electronic device in a closed state according to the present invention, an exploded view of the portable electronic device, a schematic drawing showing a driving unit at an initial position and the support unit in a closed state according to a first embodiment, a schematic drawing showing the driving unit at a driving position and the support unit rotating from the closed state to the support state, and a schematic drawing of the driving unit according to a second embodiment.

Figure 1:
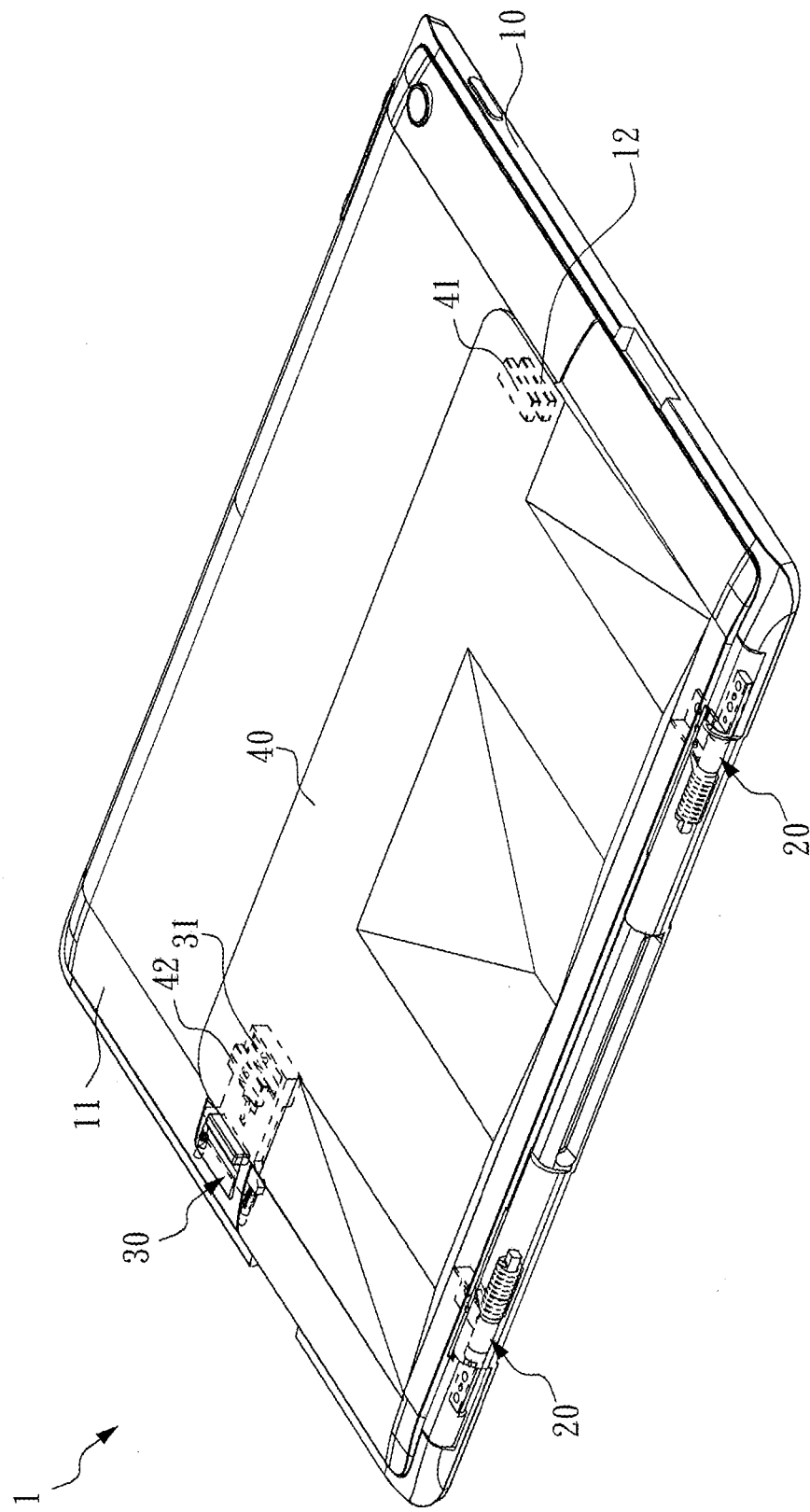
FIG. 1 is a schematic drawing showing a support unit of a portable electronic device in a closed state according the present invention.
Figure 2:
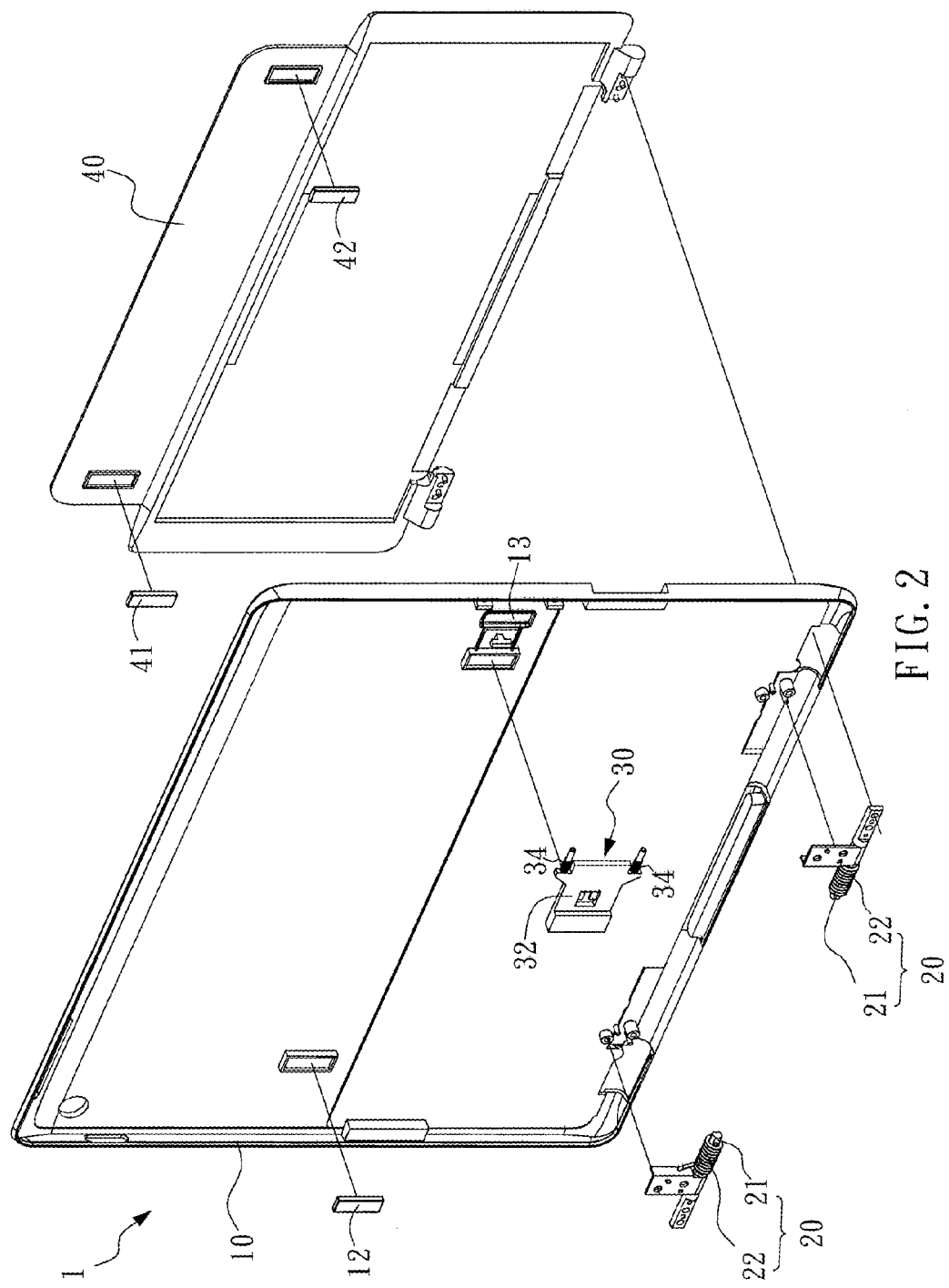
FIG. 2 is an exploded view of the portable electronic device according to the present invention.

As shown in FIG. 1, the portable electronic device 1 in the present invention is a tablet computer, but the present invention is not limited thereto. The portable electronic device 1 may also be a display screen, integrated computer system, smart phone or other similar electronic device. As shown in FIG. 1 to FIG. 2, the portable electronic device 1 in the present embodiment includes a main body 10, a hinge unit 20, a driving unit 30 and a support unit 40, wherein the hinge unit 20 is disposed at one end of the main body 10. The driving unit 30 is movably disposed in the main body 10, such that the driving unit 30 moves relative to the main body 10 between an initial position P1 (FIG. 3) and a driving position P2 (FIG. 4). The support unit 40 is disposed on a rear side 11 of the main body 10. The support unit 40 is rotatable and connected to the main body 10 through hinge unit 20, such that the support unit 40 moves relative to the main body 10 between a closed state (FIG. 1) and a support state. It should be noted here that the main body 10 is provided with a tablet computer host and related electronic parts (not shown).

As shown in FIG. 1, the main body 10 includes a first connecting element 12 disposed on a rear side 11 thereof, a driving unit 30 including a second connecting element 31, and a support unit 40 including a third connecting element 41 and a fourth connecting element 42, wherein the third connecting element 41 and the fourth connecting element 42 are disposed at opposite sides of the support unit 40. As shown in FIG. 1, when the support unit 40 is in the closed state, the third connecting element 41 is connected to the first connecting element 12, and the fourth connecting element 42 is connected to the second connecting element 31. It should be noted here that the first connecting element 12, the second connecting element 31, the third connecting element 41 and the fourth connecting element 42 in the present embodiment are all magnetic elements, such as magnets. When the support unit 40 is in the closed state, the third connecting element 41 is connected to the first connecting element 12 through a magnetic force, and the fourth connecting element 42 is connected to the second connecting element 31 through a magnetic force. It should be noted here that, besides magnets, the first connecting element 12, the second connecting element 31, the third connecting element 41 and the fourth connecting element 42 may also be electromagnets or other magnetic substances.

Figure 3:
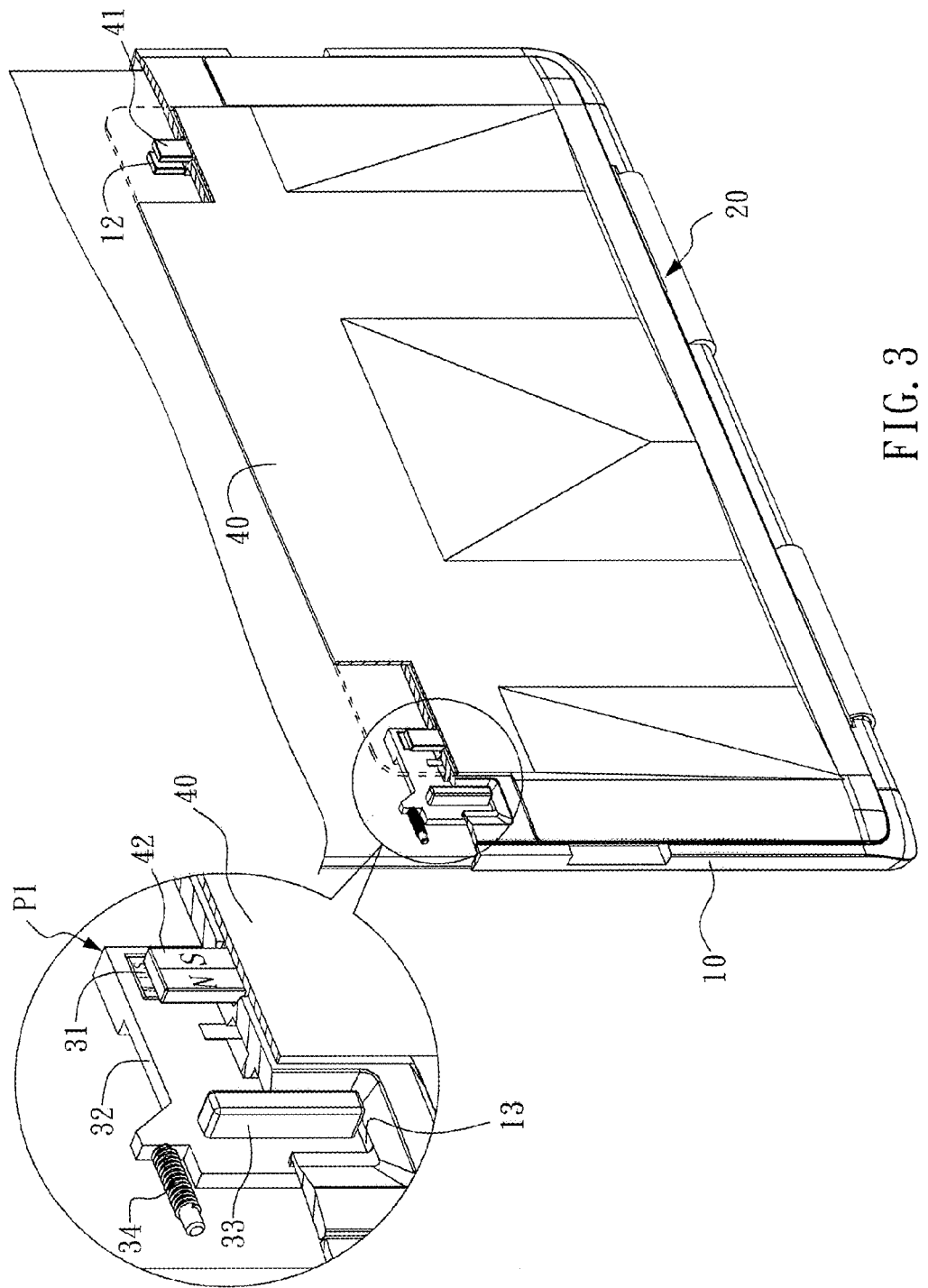
FIG. 3 is a schematic drawing showing a driving unit in an initial position and the support unit in a closed state according to a first embodiment.
Figure 4:
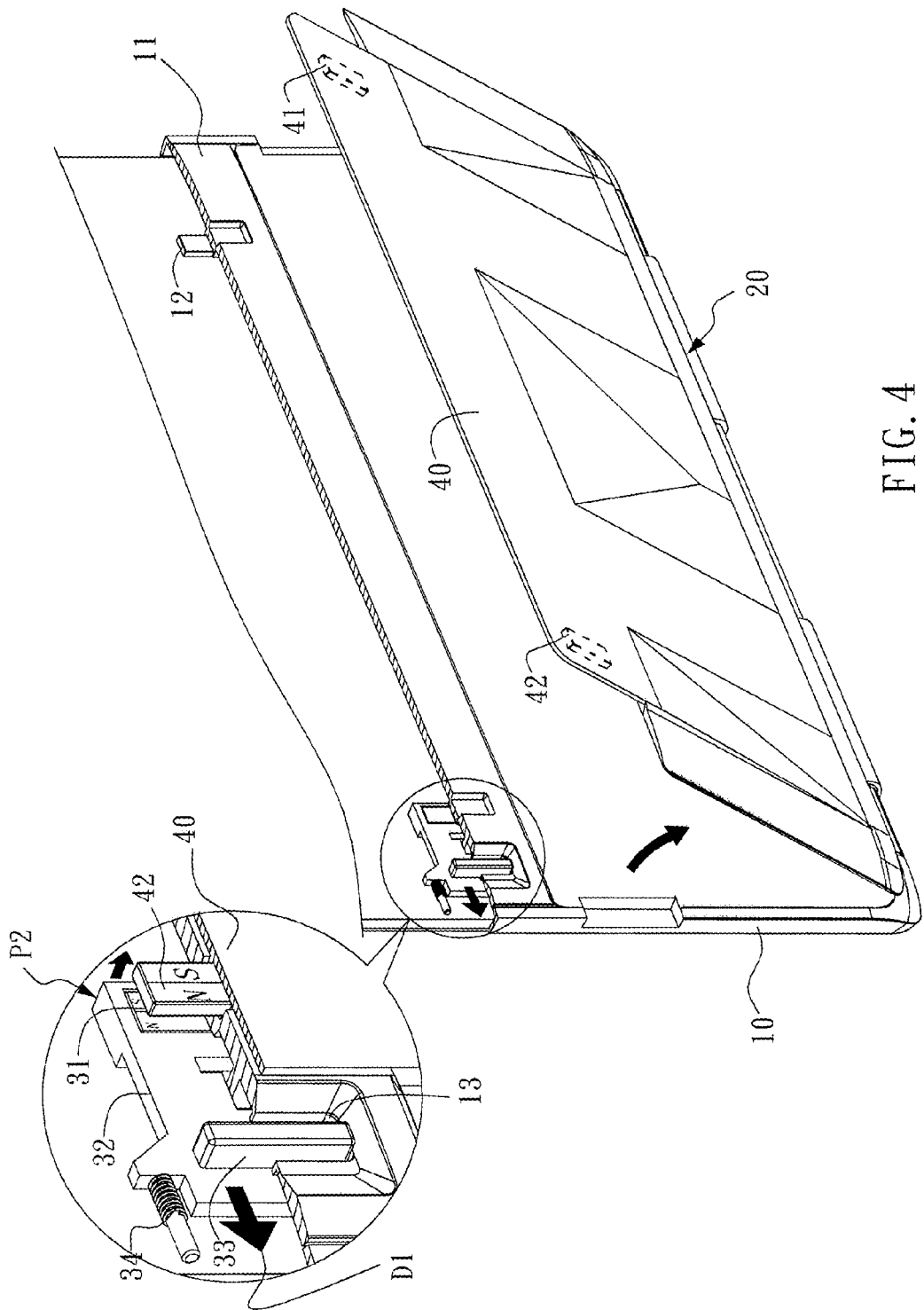
FIG. 4 is a schematic drawing showing the driving unit in a driving position and the support unit rotating from the closed state to the support state according to the first embodiment.

In the present embodiment, as shown in FIG. 3, the driving unit 30 further includes a moving element 32, a driving button 33 and a restoring element 34, wherein the second connecting element 31 is disposed at one side of the moving element 32, and the driving button 33 is disposed at the opposite side of the moving element 32, such that the driving button 33 drives the moving element 32 to move, and the driving button 33 passes through an opening 13 and is exposed to the main body 10. As shown in FIG. 3 and FIG. 4, when the driving unit 30 is at the initial position P1, an N pole at the left side of the second connecting element 31 attracts an S pole at the right side of the fourth connecting element 42. When the driving button 33 moves from an initial position P1 in the first direction D1 to a driving position P2, it drives the moving element 32 to move in the first direction D1, such that the N and S poles of the second connecting element 31 align with the N and S poles of the fourth connecting element 42, causing the like poles of the second connecting element 31 and the fourth connecting element 42 repel each other. As such, the second connecting element 31 detaches from the fourth connecting element 42. Then, through the repulsive force between the like poles of the second connecting element 31 and the fourth connecting element 42 and the rotation of the hinge unit 20, the first connecting element 12 detaches from the third connecting element 41, such that the support unit 40 rotates from the closed state to the support state. In another embodiment, at the initial position P1, the N and S poles of the second connecting element 31 align with the N and S poles of the fourth connecting element 42 respectively and the different poles of magnets attract each other. When the driving button 33 moves in the first direction D1 from the initial position P1 to the driving position P2, it drives the moving element 32 to move in the first direction D1, such that magnetic force of the magnetic elements between the second connecting element 31 and the fourth connecting element 42 is changed to repulsive force, causing the like poles of the second connecting element 31 and the fourth connecting element 42 repel each other. This also enables the second connecting element 31 to detach from the fourth connecting element 42.

In the present embodiment, the hinge unit 20 includes a rotating shaft 21 and a torsion spring 22. By selecting different torque of the torsion spring 22, the support unit 40 can be flipped to different support angles. It is worth noting that the hinge unit 20 includes a torque element. The elastic force of the torsion spring 22 must be greater than the torque generated by the torque element such that the support unit 40 could be pushed away. The torsion spring 22 selected in the present embodiment allows the support unit 40 to flip 80 degrees relative to the main body 10, such that the support unit 40 is in the support state. It should be noted here that the torque provided by the hinge unit 20 not only allows the support unit 40 to flip 80 degrees relative to the main body 10, but needs to overcome the binding force of the first connecting element 12 and the third connecting element 41; that is, the repulsive force of the like poles between the second connecting element 31 and the fourth connecting element 42 needs to overcome the binding force of the first connecting element 12 and the third connecting element 41, such that the support unit 40 flips relative to the main body 10 to drive the first connecting element 12 to detach from the third connecting element 41.

Figure 5:
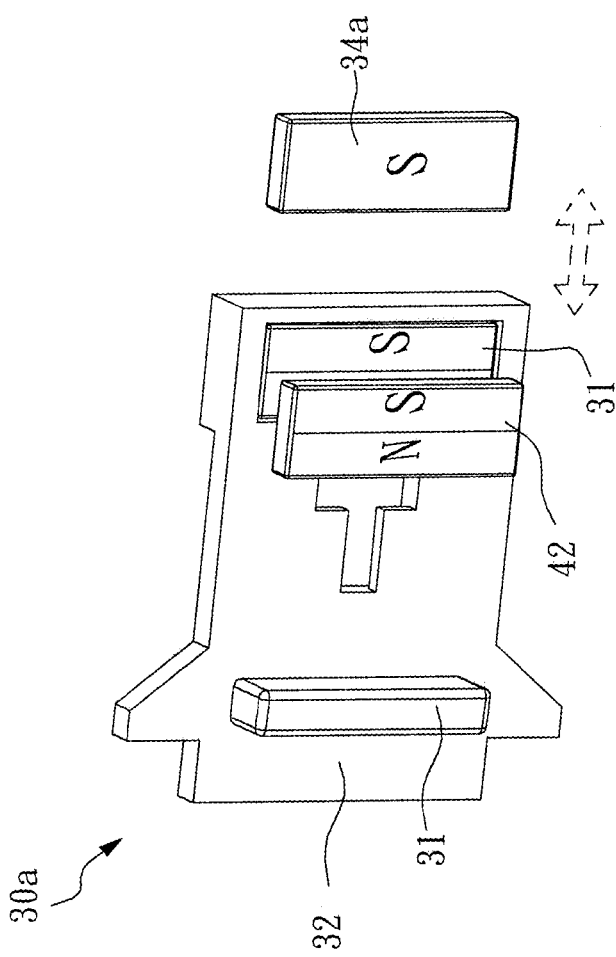
FIG. 5 is a schematic drawing of the driving unit according to a second embodiment.

As shown in FIG. 3 and FIG. 4, after the moving element 32 moves to the driving position P2, through the restoring force of the restoring element 34, the moving element 32 allows the moving element 32 to restore to the initial position P1. In the present embodiment, the restoring element 34 is a spring, but the present invention is not limited thereto. As shown in FIG. 5, according to an embodiment of the present invention, the restoring element 34a may also be a permanent magnet or an electromagnet. After the moving element 32 moves to be near to the restoring element 34a, through the magnetic repulsion of the same poles between the restoring element 34a and the second connecting element 31, the moving element 32 can be push back to the initial position P1. It should be noted here that magnetic poles shown in FIG. 1 to FIG. 5 are only illustrative, but the present invention is not limited to the pole configuration.

Figure 6:
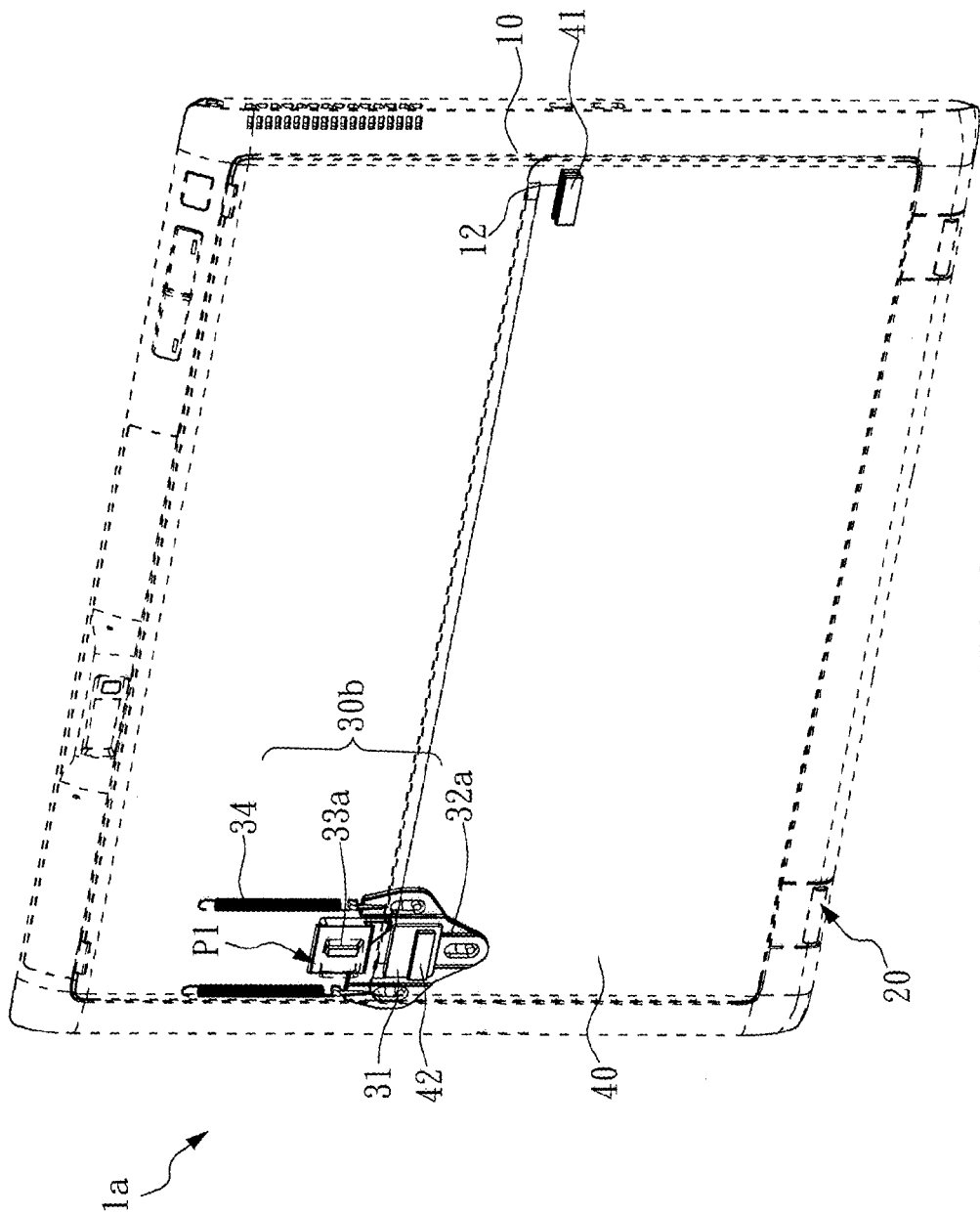
FIG. 6 is a schematic drawing showing the driving unit at the initial position and the support unit in the closed state according to a third embodiment.
Figure 7B:
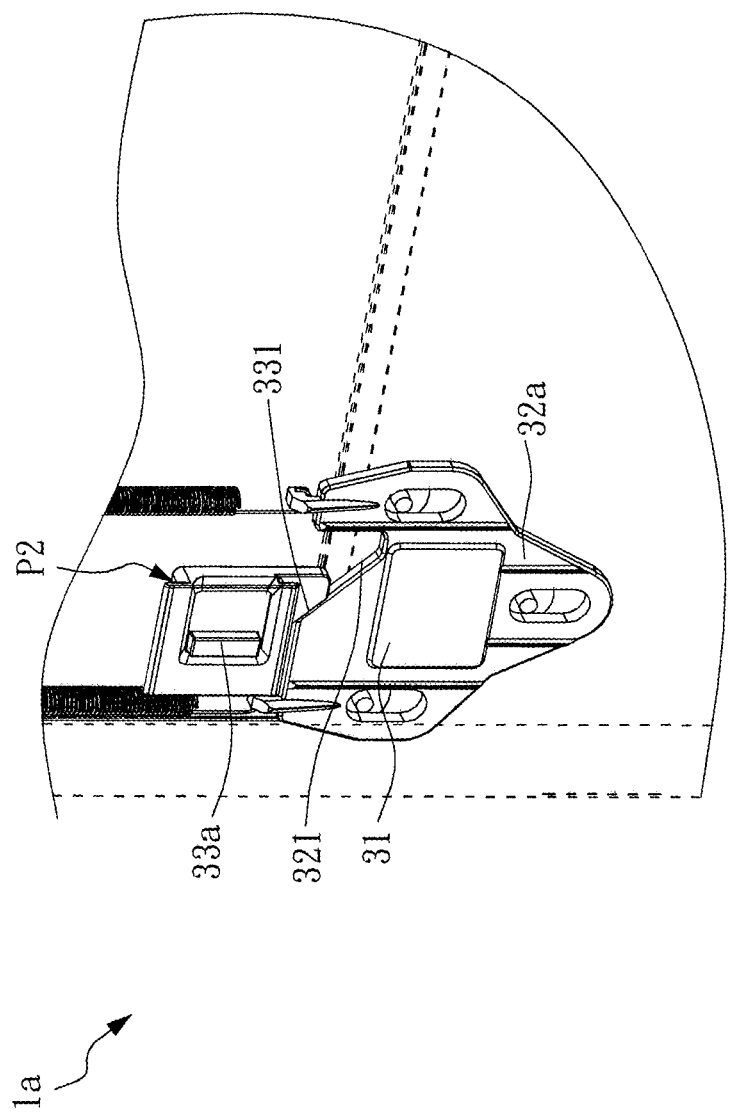

Hereafter, please refer to FIGS. 6, 7A, and 7B which are a schematic drawing showing a driving unit of a portable electronic device in an initial position and a support unit in a closed state according to a third embodiment of the present invention, a schematic drawing showing the driving unit at the driving position and the support unit is rotating from the closed state to the support state, and a partial enlarged view of the driving unit according to the third embodiment.

The significant difference between two embodiments in the present embodiment is that, the driving button 33a of the driving unit 30b in the present embodiment and the moving element 32a are two separate elements. As shown in FIGS. 6, 7A and 7B, in the present embodiment, the driving button 33a includes an interactive inclined plane 331. A contact inclined plane 321 is provided at a position corresponding to the interactive inclined plane 331 on the moving element 32a. When the driving button 33 moves in the first direction D1, the interactive inclined plane 331 pushes against the contact inclined plane 321 to drive the moving element 32 to move in the second direction D2 from the initial position P1 to the driving position P2, causing the attractive force between the two poles of the second connecting element 31 and the fourth connecting element 42 changed to the repulsive force, such that the second connecting element 31 detaches from the fourth connecting element 42. Then, through the repulsive force of the like poles between the second connecting element 31 and the fourth connecting element 42 and rotation of the hinge unit 20, the first connecting element 12 detaches from the third connecting element 41, such that the support unit 40 rotates from the closed state to the support state. As shown in FIGS. 7A and. 7B, in the present embodiment, the first direction D1 is perpendicular to the second direction D2, that is, the moving direction of the driving button 33 is perpendicular to that of the moving element 32*a*. Through a restoring element 34 (a spring in the present embodiment), the moving element 32*a* of the driving unit 30*b* enables the second connecting element 31 to restore to its initial position.

Figure 8A:
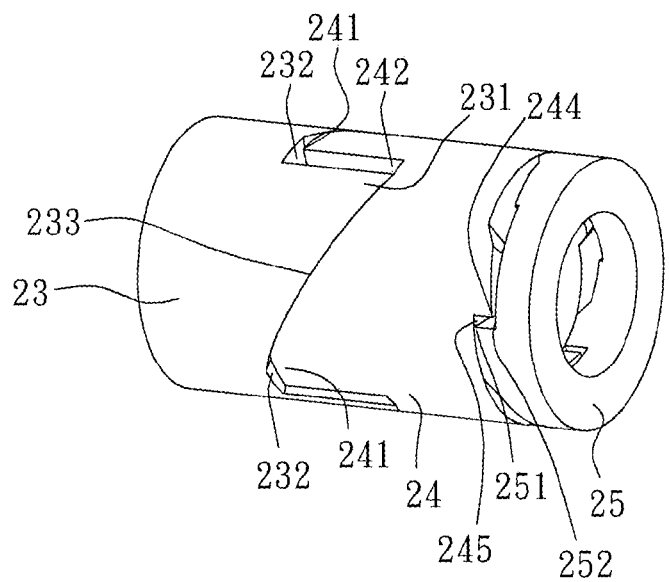
FIG. 8A to FIG. 8C are schematic drawings showing how a first cam, a second cam and a third cam of a hinge unit interact when the support unit rotates from the support state to the closed state according to the present invention.
Figure 8B:
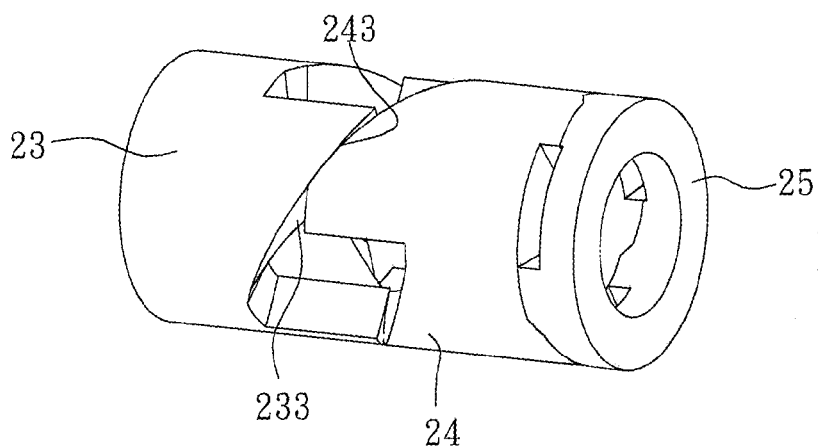
Figure 8C:
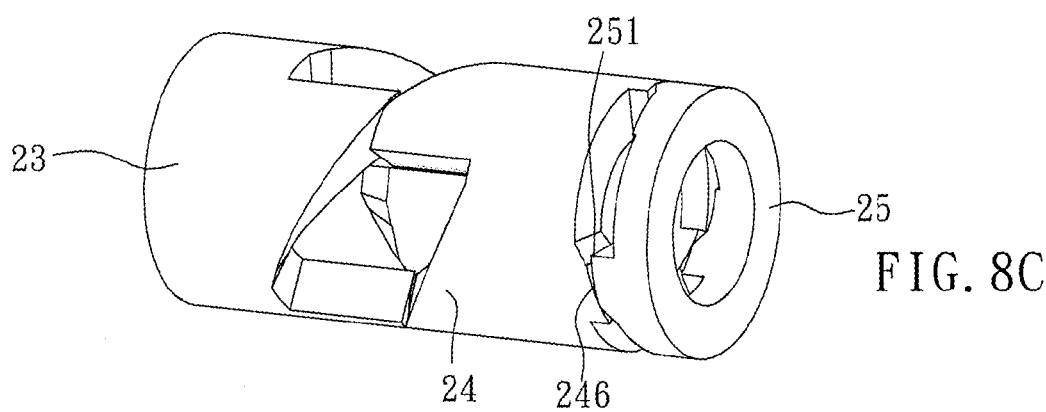

Hereafter, please refer to FIG. 8A to FIG. 8C which are schematic drawings of interaction among a first cam, a second cam, and a third cam of a hinge unit when the support unit of the portable electronic device rotates from the support state to the closed state according to the present invention.

According to an embodiment of the present invention, to allow the support unit 40 to open gently and close heavily, and enable the hinge unit 20 to generate extra torque, the hinge unit 20 may further include a first cam 23, a second cam 24 and a third cam 25. Specifically, the opposite sides of the second cam 24 rotate in contact with the first cam 23 and the third cam 25 respectively. The state as shown in FIG. 8A represents the relative position of the first cam 23, the second cam 24 and the third cam 25 when the support unit is in the support state. The state as shown in FIG. 8B represents the relative position of the first cam 23, the second cam 24 and the third cam 25 in the process of the support unit is rotating from the support state to the closed state, and the angle between the support unit and the rear side is 30°. The state as shown in FIG. 8C represents the relative position of the first cam 23, the second cam 24 and the third cam 25 in the process of the support unit is rotating from the support state to the closed state after an angle between the support unit and the rear side is less than a predetermined value (30 degrees in the present embodiment).

As shown in FIG. 8A, the first cam 23 includes a first protrusion 231, a first recess 232 and a first contact surface 233, wherein the first protrusion 231 is adjacent to the first recess 232. The second cam 24 includes a second protrusion 241 and a second recess 242. The second protrusion 241 and the second recess 242 fit in with the first recess 232 and the first protrusion 231. The third cam 25 includes a third protrusion 251 and a third recess 252, wherein the third protrusion 251 is adjacent to the third recess 252. The second cam 24 further includes a fourth protrusion 244 and a fourth recess 245. The fourth protrusion 244 and the fourth recess 245 fit in with the third recess 252 and the third protrusion 251.

As shown in FIG. 8A, when the support unit is in the support state, the first protrusion 231 contacts the second recess 242, the first recess 232 contacts the second protrusion 241, the third protrusion 251 contacts the fourth recess 245, and the third recess 252 contacts the fourth protrusion 244. As shown in FIG. 8B, in the process that the support state switches to the closed state, the second contact surface 243 moves along the first contact surface 233. In this state, the torque between the first cam 23 and the second cam 24 is increased, and thus no extra torque is provided between the second cam 24 and third cam 25. As shown in FIG. 8C, the second cam 24 further includes a fourth contact surface 246. In the process that the support unit rotates from the support state to the closed state, and after the angle between the support unit and the rear side is less than 30°, the third protrusion 251 begins to contact with the fourth contact surface 246 and move along the fourth contact surface 246, such that extra torque between the second cam 24 and the third cam 25 is generated and the overall torque of the hinge unit 20 is increased. Thereby the objective of increasing the torque of the hinge unit when the support unit is folded can be achieved. It should be noted here that, to increase torque of the hinge unit when the support unit is folded, the fourth contact surface 246 shall be an inclined plane, but the first contact surface 233 and the second contact surface 243 are not particularly limited. The first contact surface 233 and the second contact surface 243 may be inclined planes or curved surfaces.

Through the design of the present invention, a user only needs to move the driving button 33, enable the magnetic elements between the second connecting element 31 and the fourth connecting element 42 to generate the repulsive force, allowing the second connecting element 31 to detach from the fourth connecting element 42, and then, through the magnetic repulsion between the second connecting element 31 and the fourth connecting element 42 and rotation of the hinge unit 20, enable the first connecting element 12 to detach from the third connecting element 41. Accordingly, the support unit 40 can rotate from the closed state to the support state, by which one side of the main body 10 and the support unit 40 can detach from each other and the support unit 40 can be opened up.

It should be noted that the described embodiments are only for illustrative and exemplary, and that various changes and modifications may be made to the described embodiments without departing from the scope of the invention as disposed by the appended claims.

What is claimed is:
1. A portable electronic device, comprising:
    a main body, which comprises a rear side and a first connecting element;
    a hinge unit, which is disposed at one end of the main body;
    a driving unit, which is movably disposed in the main body, such that the driving unit moves relative to the main body to an initial position and a driving position, the driving unit comprising a second connecting element;
    a support unit, which is disposed at the rear side of the main body, being rotatable and connected to the main body through the hinge unit, such that the support unit rotates relative to the main body around a closed state and a support state, the support unit comprising:
    a third connecting element, which is connected to the first connecting element when the support unit is in the closed state; and
    a fourth connecting element, which is connected to the second connecting element when the support unit is in the closed state,
    whereby, when the driving unit moves from the initial position to the driving position, the second connecting element detaches from the fourth connecting element, and through the rotation of the hinge unit, the first connecting element detaches from the third connecting element, and the support unit rotates from the closed state to the support state.
2. The portable electronic device as claimed in claim 1, wherein the first connecting element, the second connecting element, the third connecting element and the fourth connecting element are all magnetic elements; when the support unit is in the closed state, the third connecting element is connected to the first connecting element through a magnetic force, and the fourth connecting element is connected to the second connecting element through a magnetic force.

3. The portable electronic device as claimed in claim 2, when the driving unit moving from the initial position to the driving position drives the second connecting element to move along a first direction, and allow the magnetic force of magnetic elements between the second connecting element and the fourth connecting element to change to repulsive force; then, through the repulsive force between the second connecting element and the fourth connecting element, the second connecting element detaches from the fourth connecting element, the support unit rotates from the closed state to the support state, and through the rotation of the hinge unit, the first connecting element detaches from the third connecting element.

4. The portable electronic device as claimed in claim 3, wherein the hinge unit includes a rotating shaft and a torsion spring.

5. The portable electronic device as claimed in claim 1, wherein the driving unit includes a moving element and a driving button, and the second connecting element is disposed at one side of the moving element, and the driving button is disposed at the opposite side of the moving element, driving the driving button to move the moving element and exposed to the main body; the driving button moving in a first direction drives the moving element to move from the initial position to the driving position, such that magnetic force of magnetic elements between the second connecting element and the fourth connecting element being changed to repulsive force, by which the second connecting element detaches from the fourth connecting element, the support unit rotates from the closed state to the support state, and through the rotation of the hinge unit, the first connecting element detaching from the third connecting element.

6. The portable electronic device as claimed in claim 5, wherein the driving unit comprises a restoring element, which enables the moving element to restore to the initial position through the restoring element after the moving element moves to the driving position.

7. The portable electronic device as claimed in claim 5, wherein the moving element moves along a second direction from the initial position to the driving position, and the first direction is perpendicular to the second direction.

8. The portable electronic device as claimed in claim 7, wherein the driving button comprises an interactive inclined plane, and a contact inclined plane is provided at a position corresponding to the interactive inclined plane on the moving element; when the driving button moving in the first direction, the interactive inclined plane pushing against the contact inclined plane, such that the moving element moving in the second direction from the initial position to the driving position.

9. The portable electronic device as claimed in claim 8, wherein the driving unit comprises a restoring element; after the moving element moves to the driving position, through the restoring element, the moving element enables the second connection to return to its initial position.

10. The portable electronic device as claimed in claim 5, wherein the restoring element is a spring or a magnet.

11. The portable electronic device as claimed in claim 4, wherein the hinge unit comprises a first cam, a second cam and a third cam, and the opposite sides of the second cam rotate in contact with the first cam and the third cam respectively.

12. The portable electronic device as claimed in claim 11, wherein the first cam comprises at least one first protrusion and at least one first recess, the at least one first protrusion is adjacent to the at least one first recess, the second cam comprises at least one second protrusion and at least one second recess, and the at least one second protrusion and the at least one second recess fit in with the at least one first recess and the at least one first protrusion; when the support unit being in the support state, the at least one first protrusion being in contact with the at least one second recess, and the at least one first recess being in contact with the at least one second protrusion.

13. The portable electronic device as claimed in claim 11, wherein the first cam comprises a first contact surface, and the second cam comprises a second contact surface, and when the support unit switches from the support state to the closed state, the second contact surface moves along the first contact surface.

14. The portable electronic device as claimed in claim 13, wherein the third cam comprises at least one third protrusion and at least one third recess, the at least one third protrusion is adjacent to the at least one third recess, and the second cam comprises at least one fourth protrusion and at least one fourth recess; the at least one fourth protrusion and the at least one fourth recess fitting in with the at least one third recess and the at least one third protrusion; when the support unit being in the support state, the at least one third protrusion being in contact with the at least one fourth recess, and the at least one third recess being in contact with the at least one fourth protrusion.

15. The portable electronic device as claimed in claim 14, wherein the second cam comprises a fourth contact surface, and in the process that the support unit switches from the support state to the closed state, when an angle between the support unit and the rear side is less than a predetermined value, the at least one third protrusion is in contact with the fourth contact surface and moves along the fourth contact surface to increase a torque of the hinge unit.

16. The portable electronic device as claimed in claim 15, wherein the fourth contact surface is an inclined plane.

17. The portable electronic device as claimed in claim 15, wherein the predetermined value is 30 degrees.

18. The portable electronic device as claimed in claim 13, wherein the first contact surface is an inclined plane or a curved surface, the second contact surface is an inclined plane or a curved surface.

* * * * *